United States Patent
Schrijen et al.

(10) Patent No.: US 8,856,533 B2
(45) Date of Patent: *Oct. 7, 2014

(54) DEVICE, SYSTEM AND METHOD FOR DETERMINING AUTHENTICITY OF AN ITEM

(75) Inventors: Geert Jan Schrijen, Eindhoven (NL); Pim Theo Tuyls, Eindhoven (NL); Thomas Andreas Maria Kevenaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1215 days.

This patent is subject to a terminal disclaimer.

(21) Appl. No.: 12/066,674

(22) PCT Filed: Sep. 6, 2006

(86) PCT No.: PCT/IB2006/053128
§ 371 (c)(1), (2), (4) Date: Mar. 13, 2008

(87) PCT Pub. No.: WO2007/031908
PCT Pub. Date: Mar. 22, 2007

(65) Prior Publication Data
US 2008/0256600 A1    Oct. 16, 2008

(30) Foreign Application Priority Data
Sep. 14, 2005    (EP) .................................... 05108441

(51) Int. Cl.
*H04L 9/00* (2006.01)
*H04L 9/32* (2006.01)
*G06F 11/30* (2006.01)
*G06F 17/30* (2006.01)
*G06F 21/60* (2013.01)
*G06F 21/72* (2013.01)
*G06F 21/86* (2013.01)
*H04L 9/14* (2006.01)
*H04L 9/08* (2006.01)

(52) U.S. Cl.
CPC .............. *G06F 21/86* (2013.01); *H04L 9/3278* (2013.01); *G06F 2221/2143* (2013.01); *G06F 21/60* (2013.01); *G06F 21/72* (2013.01); *H04L 9/14* (2013.01); *H04L 9/3218* (2013.01); *H04L 9/0861* (2013.01); *G06F 2221/2121* (2013.01); *H04L 2209/805* (2013.01)
USPC .................. 713/176; 380/44; 713/189; 726/2

(58) Field of Classification Search
USPC ........................................................ 713/176
See application file for complete search history.

(56) References Cited

U.S. PATENT DOCUMENTS 4,630,845 A * 12/1986 Sanner ............................ 283/91
4,686,515 A *  8/1987 Anderson et al. ............. 340/5.8

(Continued)

FOREIGN PATENT DOCUMENTS

EP    1477940 A2    11/2004
GB    2333933 A      3/2003

(Continued)

OTHER PUBLICATIONS

Gassend et al., Controlled Physical Random Functions, IEEE, 2002.*

(Continued)

*Primary Examiner* — Fatoumata Traore
(74) *Attorney, Agent, or Firm* — Larry Liberchuk (57) ABSTRACT

This invention relates to physical uncloneable function (PUF) devices for determining authenticity of an item, systems for determining authenticity of a physical item, and methods for determining authenticity of an item. A PUF pattern of the PUF device is damaged when using the item for the first time.

10 Claims, 4 Drawing Sheets

(56) References Cited

U.S. PATENT DOCUMENTS

| | | | |
|---|---|---|---|
| 4,816,824 A * | 3/1989 | Katz et al. ................... 340/5.86 |
| 5,360,628 A * | 11/1994 | Butland ........................... 427/7 |
| 5,442,433 A * | 8/1995 | Hoshino et al. ................ 356/71 |
| 5,583,631 A * | 12/1996 | Lazzerini ....................... 356/71 |
| 5,762,377 A * | 6/1998 | Chamberlain .................. 283/67 |
| 5,818,021 A * | 10/1998 | Szewczykowski ........... 235/380 |
| 5,873,604 A * | 2/1999 | Phillips ........................... 283/70 |
| 5,895,073 A * | 4/1999 | Moore ............................. 283/70 |
| 5,979,941 A * | 11/1999 | Mosher et al. ................. 283/67 |
| 6,226,619 B1 * | 5/2001 | Halperin et al. ............... 705/23 |
| 6,501,390 B1 * | 12/2002 | Chainer et al. .......... 340/870.16 |
| 6,609,728 B1 * | 8/2003 | Voerman et al. ............... 283/70 |
| 6,859,745 B2 * | 2/2005 | Carr et al. ....................... 702/81 |
| 6,868,408 B1 * | 3/2005 | Rosen ............................. 705/64 |
| 6,888,509 B2 * | 5/2005 | Atherton ....................... 343/718 |
| 6,982,640 B2 * | 1/2006 | Lindsay et al. ............... 340/540 |
| 6,996,543 B1 * | 2/2006 | Coppersmith et al. ......... 705/50 |
| 7,009,519 B2 * | 3/2006 | Leonard et al. ............. 340/572.8 |
| 7,012,531 B2 * | 3/2006 | Fries et al. ................. 340/572.7 |
| 7,017,043 B1 * | 3/2006 | Potkonjak .................... 713/176 |
| 7,017,807 B2 * | 3/2006 | Kipp et al. .................... 235/385 |
| 7,048,179 B2 * | 5/2006 | Claessens et al. ............ 235/375 |
| 7,061,382 B2 * | 6/2006 | Claessens et al. ......... 340/572.8 |
| 7,080,041 B2 * | 7/2006 | Nagel ............................. 705/51 |
| 7,089,420 B1 * | 8/2006 | Durst et al. ................... 713/176 |
| 7,098,794 B2 * | 8/2006 | Lindsay et al. ............ 340/572.3 |
| 7,152,047 B1 * | 12/2006 | Nagel ............................. 705/76 |
| 7,162,035 B1 * | 1/2007 | Durst et al. ..................... 380/54 |
| 7,187,267 B2 * | 3/2007 | Cole ............................ 340/10.1 |
| 7,273,181 B2 * | 9/2007 | White ............................ 235/486 |
| 7,283,630 B1 * | 10/2007 | Doljack ........................... 380/55 |
| 7,322,520 B2 * | 1/2008 | Warden et al. ................ 235/383 |
| 7,364,074 B2 * | 4/2008 | He et al. ........................ 235/385 |
| 7,490,054 B2 * | 2/2009 | Reade et al. .................... 705/16 |
| 7,566,004 B2 * | 7/2009 | He et al. ........................ 235/385 |
| 7,586,417 B2 * | 9/2009 | Chisholm .................. 340/572.8 |
| 7,617,132 B2 * | 11/2009 | Reade et al. .............. 705/26.61 |
| 7,734,446 B2 * | 6/2010 | Squibbs et al. ............... 702/189 |
| 7,750,793 B2 * | 7/2010 | Juels ............................ 340/10.5 |
| 7,752,137 B2 * | 7/2010 | Dillon ............................. 705/51 |
| 7,853,477 B2 * | 12/2010 | O'Shea et al. ............... 705/14.1 |
| 7,996,319 B2 * | 8/2011 | Dillon ............................. 705/50 |
| 8,009,017 B2 * | 8/2011 | Park et al. .................... 340/10.1 |
| 2002/0095383 A1 * | 7/2002 | Mengin et al. .................. 705/50 |
| 2002/0186145 A1 * | 12/2002 | Chainer et al. .......... 340/870.16 |
| 2004/0112962 A1 | 6/2004 | Farrall et al. |
| 2005/0038756 A1 * | 2/2005 | Nagel .............................. 705/76 |
| 2007/0060302 A1 * | 3/2007 | Fabbri ............................ 463/24 |
| 2007/0106892 A1 * | 5/2007 | Engberg ....................... 713/168 |

FOREIGN PATENT DOCUMENTS

| | | |
|---|---|---|
| WO | WO2004105125 A2 | 12/2004 |
| WO | WO2005041000 A1 | 5/2005 |
| WO | WO2005043805 A1 | 5/2005 |
| WO | WO2007034389 A2 | 3/2007 |

OTHER PUBLICATIONS

Suh et al., AEGIS: A Single Chip Secure processor, Elsevier, 2005.*

Gassend, Physical Random Functions, 2001, MIT.*

Gassend et al., Silicon Physical Random Functions, ACM, Nov. 2002.*

Gassend, B.: "Physical Random Functions"; Thesis at the Massachusetts Institute of Technology, February 2003, pp. 1-89.

Ranasinghe et al: "Security and Privacy Solutions for Low-Cost RFID Systems"; Intelligent Sensors, Sensor Networks and Information Processing Conference, Proceedings of the 2004 Melbourne, Australia Dec. 14-17, 2004, IEEE Dec. 14, 2003, pp. 337-342.

Ravikanth P: "Physical One-Way Functions"; Thesis at The Massachusetts of Technology, Mar. 2001, pp. 1-154.

Gassend et al: "Silicon Physical Random Functions"; CCS'02 ACM, Nov. 18-22, 2002, pp. 148-160.

Suh et al: "Design and Implementation of the Aegis Single-Chip Secure Processor Using Physical Random Functions"; Computer Architecture, 2005. ISCA'05 Proceedings, 32nd International Symposium in Madison, Wisconsin, Jun. 4-8, 2005, IEEE, pp. 25-36.

Tuyls et al: "Security Analysis of Physical Uncloeable Functions"; Optical PUF'S, 3rd Philips Conference on Digital Signal Processing, Nov. 2003, Veldhoven, The Netherlands.

Nanoink Inc., Brand Protection Technologies, Company Web Page, www.nnanoink.net, 2 Pages.

Menezes et al: "Handbook of Applied Cryptography," CRC Press, 1997, pp. 405-417.

Smart N.: "Cryptography—An Introduction", McGraw-Hill Publishers, 2003, pp. 214-219.

\* cited by examiner

DEVICE, SYSTEM AND METHOD FOR DETERMINING AUTHENTICITY OF AN ITEM

TECHNICAL FIELD

This invention relates to physical uncloneable function (PUF) devices for determining authenticity of an item, systems for determining authenticity of a physical item, and methods for determining authenticity of a physical item.

BACKGROUND OF THE INVENTION

Product piracy is a worldwide problem. It is estimated that over 5% of all world trade is in counterfeit goods, adding up to around $250 billion per year. The product piracy affects both physical products, such as watches, spare parts and medicine, as well as non-physical products, such as music and computer software. However, in some cases, the non-physical products are wrapped in a physical package or stored on some sort of physical media, for example, music on a CD, whereby also non-physical products in some cases may be seen as physical products.

In order to overcome this problem a number of different technical solutions for checking the authenticity of a product has been developed. Such a solution is, for example, a bar code system connected to a database, in which individual information for concerned items is held. However, barcodes can easily be copied. Furthermore, holding information individually for a great number of items in a variety of countries requires a lot of administration in order to be updated, because of this, other types of technical solutions, not requiring a central administration, have been developed.

In the American U.S. Pat. No. 6,226,619, such a solution is presented. More particularly, the solution comprises an interrogatable tag attached to the item. Further, the item includes visible indicia for comparison with secret non-duplicable information stored in the tag designating authenticity.

Though solutions have been presented within the area, the problem with counterfeit goods still remain. More particularly, the problem is that there are no solutions available which fulfill the demands of handiness, cost-effectiveness and high security.

SUMMARY OF THE INVENTION

In view of the above, an objective of the invention is to solve or at least reduce the problems discussed above. In particular, an objective is to achieve an improved device for determining authenticity of physical products.

According to a first aspect, the present invention is realized by a physical uncloneable function (PUF) device, comprising a PUF pattern, for determining authenticity of an item, wherein said PUF pattern is arranged to be damaged when using said item for the first time.

An advantage with this aspect is that the PUF pattern, giving rise to a secret cryptographic key, is damaged when using or opening said item. When the PUF pattern is damaged, the original secret cryptographic key is destroyed and cannot be restored anymore. Moreover, the damaged PUF pattern results in a unpredictable (random) new key that is inconsistent with the reference value used for authentication. Consequently, it is impossible, or at least very hard, to assert authenticity for an item after the first usage.

Another advantage with having a PUF device attached to an item, such as a physical product, is that the authenticity can be checked by different actors in the supply chain. For example, a retail dealer can check if his distributor delivers him authentic products, and, in turn, a customer can check whether the retail dealer offers authentic products.

More particularly, the actors in the supply chain can verify whether the item has been opened or not, or the item has been used or not.

Still another advantage is that trusted actors in the supply chain can replace PUF devices having their PUF patterns broken, in order to restore the authenticity of the products.

In one of the embodiments of the first aspect, the PUF device can further comprise that said PUF pattern is arranged to be mechanically destroyed when using said item for the first time.

An advantage with having the PUF pattern arranged to be mechanically destroyed is that it is possible to see for a person if the PUF pattern is destroyed, without using any instruments.

Another advantage is that the PUF pattern can be destroyed by hand, hence no instruments are necessarily needed.

In one of the embodiments of the first aspect of the present invention, the PUF is arranged such that it can no longer authenticate the item after being used, but can be used for e.g. identifying the item in a home environment.

In another one of the embodiments of the first aspect, the PUF pattern is a coating PUF pattern.

An advantage of having a coating PUF pattern is the low manufacturing cost.

Another advantage is that the control device communicating with a PUF device, having a coating PUF pattern, may be proportionately more economical, than, for example, a control device for an optical PUF pattern.

In another embodiment of the present first aspect, the PUF device may further comprise a memory, a processor, and communication means.

An advantage with comprising a memory, a processor and communication means in the PUF device is that the PUF device can achieve Radio Frequency Identification (RFID) functionality. Having RFID functionality, the PUF device can be seen as an RFID device with built-in functionality for determining authenticity of items.

Another advantage of implementing the PUF in an RFID device with some memory, is the fact that this memory can be used to securely link the PUF device to a physical item. More precisely, one or more identifiers of the item can be stored in the memory of the RFID device. Such identifiers could be a serial numbers, package information or other item characteristics. Preferably the item information stored in the RFID tag cannot be changed after it is written by the party that puts the tag on a product. This way the values cannot be adapted by an attacker. So this can be achieved by storing the information in write-once memory or alternatively the item information could be digitally signed by some authority using public key cryptography.

Yet another advantage is that still, if the PUF pattern is destroyed, implying that the product may have been replaced or used, the product can be identified. This is possible due to the fact that only the PUF pattern, the source to the cryptographic key, is destroyed when using or opening the product, not necessarily the entire PUF device.

Another embodiment is a PUF device of which the PUF pattern is damaged only when the item is opened the first time and hence opening the device the first time changes the cryptographic key to a new random value. Opening the item multiple times thereafter will not damage the PUF pattern any further. This way the PUF device gets a new identity (key) that can be used to identify the item in the home environment of the user.

In still another embodiment, the PUF device can be formed as a label.

An advantage with having the PUF device formed as a label is that the industry and the customers are used to labels on items. When having the PUF device formed as a label, information about the item can be written on the PUF device, hereafter referred to as label text.

Still another advantage is that, if an item text is sent to the control device electronically or optically (e.g. in the form of a barcode or with Optical Character Recognition) in association with the determination of authenticity, this item text can there after be compared with the label text. If these two texts match, the reader device is assured that the label comprising the PUF device was put on the correct item.

The texts can, for instance, comprise a serial number and/or the name of the product.

The comparison of the texts can be made manually, that is, having a person looking at the two texts, or can be made automatically, for instance by using an OCR system.

The PUF device may be an optical PUF device.

Any combination of the features of the embodiments of the first aspect of the present invention is possible to realize the inventive concept, which is presented in more detail below.

According to a second aspect of the present invention, a system is provided for determining authenticity of a physical item, comprising a PUF device and a control device arranged for communication with said PUF device. The PUF device may be according to one of the embodiments, or any combination of the embodiments, of the first aspect of the invention.

In one of the embodiments of the second aspect, the system further comprises a database arranged for communication with said control device.

An advantage with having a database is that fewer computations have to be made by the control device.

In another embodiment of the second aspect the system, the PUF device and the control device can be arranged in order to communicate via a zero-knowledge (ZK) protocol.

An advantage with using a ZK protocol is that the cryptographic key is not revealed.

In one embodiment of the second aspect of the invention, the system is arranged to digitally sign a commitment value by a trusted party using public key cryptography and store said commitment value in connection with the PUF device. The digitally signed commitment and additional item information may be jointly signed with a second digital signature.

Any combination of the features of the embodiments of the second aspect of the present invention is possible to realize the inventive concept, which is presented in more detail below.

According to a third aspect of the present invention, a method is provided for determining authenticity of an item, comprising the steps: adding a PUF device comprising a PUF pattern onto said item, using said PUF device to investigate whether said item is unchanged since said PUF device was added onto said item, and making said PUF device unusable for being authenticated by physically damaging said PUF pattern when using said item for the first time.

In one embodiment of the third aspect, said damaging comprises that the PUF device is mechanically destroyed when using said item for the first time.

The damaging may comprise changing an identity of said PUF pattern.

An advantage of this is an available identity, which can be formed arbitrarily, to be used after using the item for the first time, e.g. for identifying the item in a home environment.

The method may further comprise the step of signing a PUF pattern. The signing may be performed by using a private key, wherein the step of using said PUF may comprise verifying said PUF pattern by a public key, and said private and public keys constitute a key pair. This way it can be detected whether the PUF pattern is consistent with the authentic value by comparing a measured PUF pattern with the signed version.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

A Physical Uncloneable Function (PUF) is a function that is realized by a physical system, such that the function is easy to evaluate but the physical system is hard to characterize, and since the physical system is hard to characterize it is also hard to clone. PUFs are for example described in R. Pappu, *Physical One-Way Functions*, Ph.D. thesis, MIT, 2001. Physical arrangements produced in an uncontrolled production process, that is a production process containing some sort of randomness, are suitable for being used as PUF arrangements.

Examples of such PUF arrangements are:
  Optical PUF arrangement—a transparent medium containing disordered structures producing a speckle pattern when being illuminated by a laser beam.
  Coating PUF arrangement—a coating on an integrated circuit containing random dielectric particles from which local capacitance values may be measured.
  Acoustical PUF arrangement—a physical structure which is affected by acoustic waves.
  Silicon PUF arrangement—an integrated circuit produced in silicon having differences in circuit delays due to manufacturing variations.

Because of the randomness in the manufacturing process, each individual arrangement will generate their own specific data. Therefore, the PUF arrangements are suitable for being used as cryptographic keys.

Figure 1:
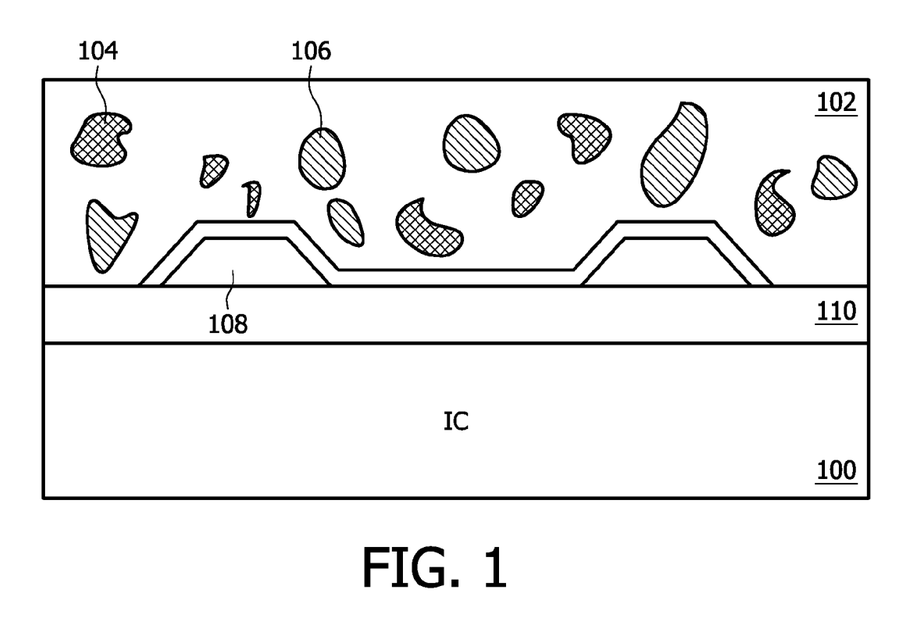
FIG. 1 diagrammatically illustrates a coating PUF arrangement.

Referring now to FIG. 1, a coating PUF arrangement is diagrammatically shown. An integrated circuit (IC) 100 has a coating 102 containing random dielectric particles. In this specific case, two types of dielectric particles 104, 106 with different dielectric constants are present. The dielectric constant, as well as, size, shape and placement for each of the particles affect the capacitance.

By measuring several different local capacitance values of the coating a characteristic pattern is achieved. This characteristic pattern may be read out with a matrix of sensor structures 108 comprised in the top metal layer of the IC 100, placed above an insulation layer 110.

Herein, the characteristic pattern for a PUF arrangement will be referred to as a "PUF pattern", and the data generated by this PUF pattern will be referred to as a "secret cryptographic key", or only "secret key".

Radio Frequency Identification (RFID) tags are integrated circuits (IC), which may be used for wireless identification of items. Today, RFID tags are widely used in supply chain management, and in the future the barcode system may be replaced by an RFID arrangement.

By combining an RFID arrangement with a PUF arrangement, a system for wireless identification and verification of authenticity is achieved. A device to be used in such a system is presented in FIG. 2.

Figure 2:
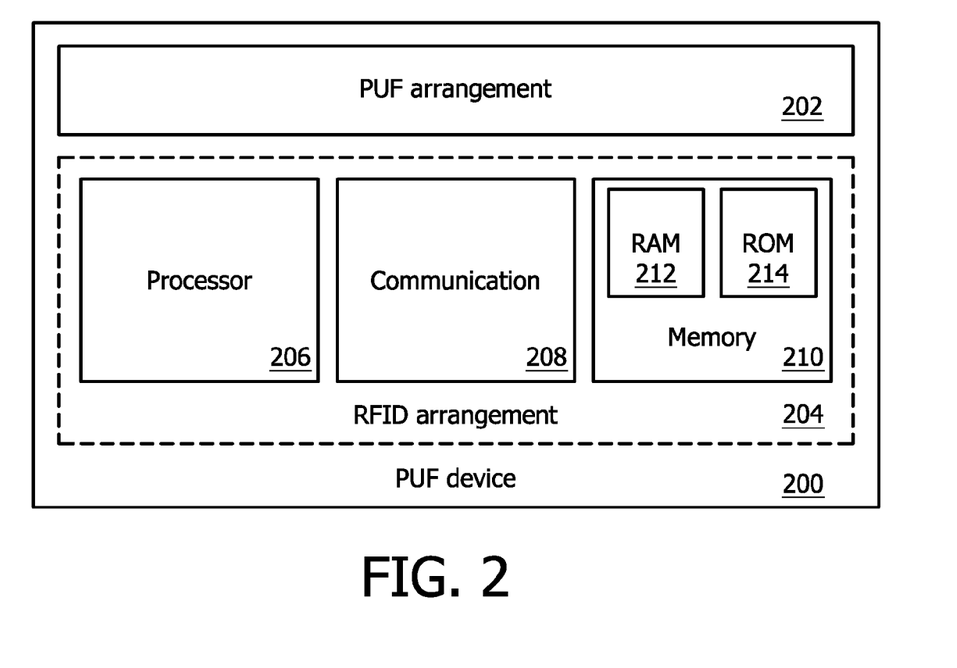
FIG. 2 diagrammatically illustrates a PUF device.

The overall device, herein referred to as a "PUF device" 200, may be in the form of a label in order to be easily attached to items.

The PUF device 200 comprises a PUF arrangement 202, preferably a coating PUF arrangement, and an RFID arrangement 204. The RFID arrangement 204 comprises, in turn, a processor 206, communication means 208 and a memory 210.

The memory 210 may be divided into a volatile memory 212, such as a RAM, and a non-volatile memory 214, such as an EEPROM, or other suitable type of ROM, wherein the volatile memory 212 may be used for temporary storing of a PUF pattern and the non-volatile memory 214 may be used for storing software instructions and data for identification purposes.

Figure 3:
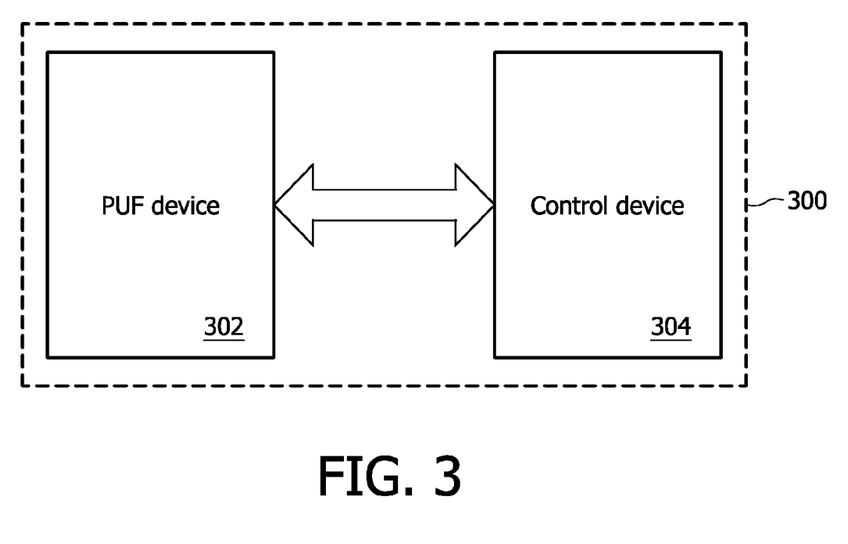
FIG. 3 diagrammatically illustrates a system for off-line verification of authenticity.

Referring to FIG. 3, a system for off-line verification 300 of authenticity is presented. The system comprises a PUF device 302 and a control device 304.

The PUF device 302 may be comprised within a label attached to an item in such a way that when the item is used for the first time the PUF pattern, within the PUF device, is destroyed. Alternatively, PUF pattern is damaged, such that the PUF device is no longer able to authenticate the item, but the PUF device can still be used for identification of the item, e.g. in a home environment. Damaging the PUF then gives it a new identity.

The control device 304 may be a hand-held device adapted to near field communication (NFC), such as a NFC-enabled mobile phone.

Figure 4:
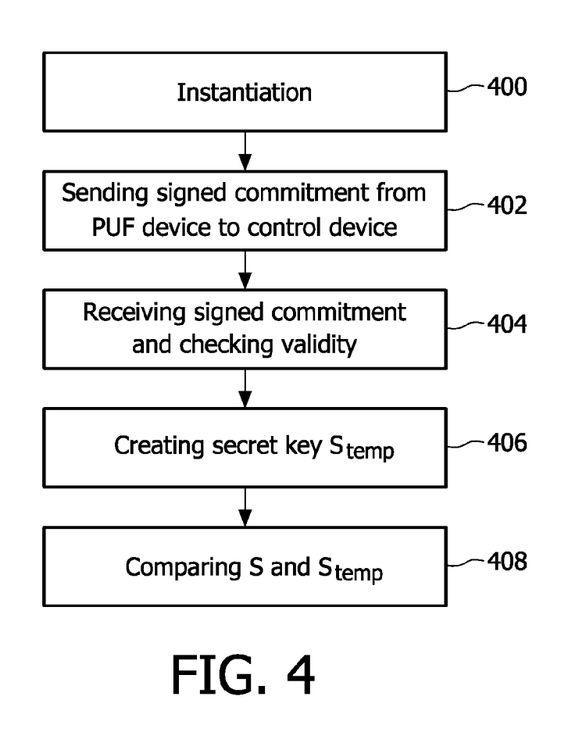
FIG. 4 shows a flow diagram for a method for off-line verification of authenticity.

Now referring to FIG. 4, the method of an off-line verification system is described.

However, before an off-line verification may be carried out, the PUF device must be enrolled. In the enrollment phase, a trusted third party with public key e signs a commitment C(S) to the secret cryptographic key S, using its private key d, and stores the signed commitment $\$_e C(S)$ into the PUF device, preferably in the non-volatile memory 214. Note, the pair e,d is a public/private key pair of which the public key e is publicly known and the private key d is kept secret by the signer. The notation $\$_e$ denotes a signature created with the private key d, which can be verified (by anyone) using public key e, for authenticating that the item has not been used or replaced.

The signed commitment $\$_e C(S)$ or the commitment C(S) do not reveal any information about the secret cryptographic key S. Furthermore, since the private key d (of the key pair e,d) has been used, it is possible for anyone to check the signature of the commitment $\$_e C(S)$, using public key e.

Firstly in the off-line verification, in step 400, an instantion message is sent from the control device to the PUF device. If the PUF device is externally powered, this step also includes powering the PUF device.

Secondly, in step 402, the commitment $\$_e C(S)$ is sent from the PUF device to the control device.

Thirdly, in step 404, the control device receives the commitment $\$_e C(S)$ and verifies that the signature is valid.

Fourthly, in step 406, the PUF device creates a secret cryptographic key $S_{temp}$ using its incorporated PUF pattern and stores this key $S_{temp}$ temporarily in the volatile memory.

Fifthly, in step 408, the PUF device and the control device interacts in order to check if the secret cryptographic key S, used in the commitment $\$_e C(S)$, corresponds to the temporarily stored secret key $S_{temp}$. In order not to reveal any secret information, such as the temporarily stored secret key $S_{temp}$, a zero-knowledge (ZK) protocol is utilized for communication between the PUF device and the control device. Below, ZK protocol will be described in more detail.

If $S_{temp}$ and S turn out to be the same, the PUF device has not been changed since the enrollment, which implies that the item is authentic.

However, for instance, if someone has opened or used the item in such a way that the label which comprises the PUF device, especially the PUF pattern, has been damaged, this will be detected due to the fact that $S_{temp}$ will not be the same as S.

The basic idea with a ZK protocol is to proof the possession of a secret without revealing it. In this case the secret key S, used in order to get the commitment $\$_e C(S)$, and the temporarily stored secret key $S_{temp}$ should be proven to be equal without revealing any of them.

The signed commitment $\$_e C(S)$ is preferably stored in the memory of the RFID device containing the PUF. In order to securely link the RFID device with a certain physical object or item, an additional signature $\$'(\$_e C(S), ItemText)$ on both the signed commitment and a value 'ItemText' is preferably stored in the RFID device as well. Here ItemText denotes a certain characteristic of the item like text on the item, serial number, barcode etc. The second signature $\$'$ is created using public key cryptography by the party that embeds the RFID. The reader device could check whether this second signature $\$'$ is valid and whether the ItemText matches with the scanned item before starting the ZK protocol. Alternatively the ItemText could be displayed on the reader device such that the user can check that the scanned RFID tag with PUF is the correct tag that matches with the item that he is scanning.

One possible ZK protocol is Schnorr's identification protocol. This protocol is not really a ZK protocol in the strict sense, but may be used anyhow. Other ZK protocols may be used as well.

In brief, Schnorr's identification protocol goes as follows: three public numbers, denoted p, q and g are chosen where p is a 1024 bit prime number, q is 160 bit prime number and g is a generator of multipliable order of q, and determine the commitment to S by $C(S) = g^S \mod p$, where S may be assumed to be a number between 0 and q.

Thereafter, a random number r, fulfilling $1 \leq r \leq q-1$, may be generated by the PUF device, and, next, a corresponding public value x, according to $x = g^r \bmod p$, may be determined.

After that, the control device generates a random challenge e for which the PUF device generates a response y, according to $y = S*e + r \bmod q$.

This response is sent back to the control device who can then check that the response is correct with regard to the values x, e and the commitment C(S) that was signed by the trusted third party, according to $g^y = x*(C(S))^e \bmod p$.

In terms of ZK protocols, the PUF device has the role of the prover, the control device has the role of the verifier and S functions as the witness.

Instead of using an off-line verification system based on public key cryptography, an on-line verification system based on symmetric-key cryptography or hash functions may be used. The advantage of using an on-line verification system is that symmetric crypto and hash functions are much cheaper in terms of hardware and computation costs.

Figure 5:
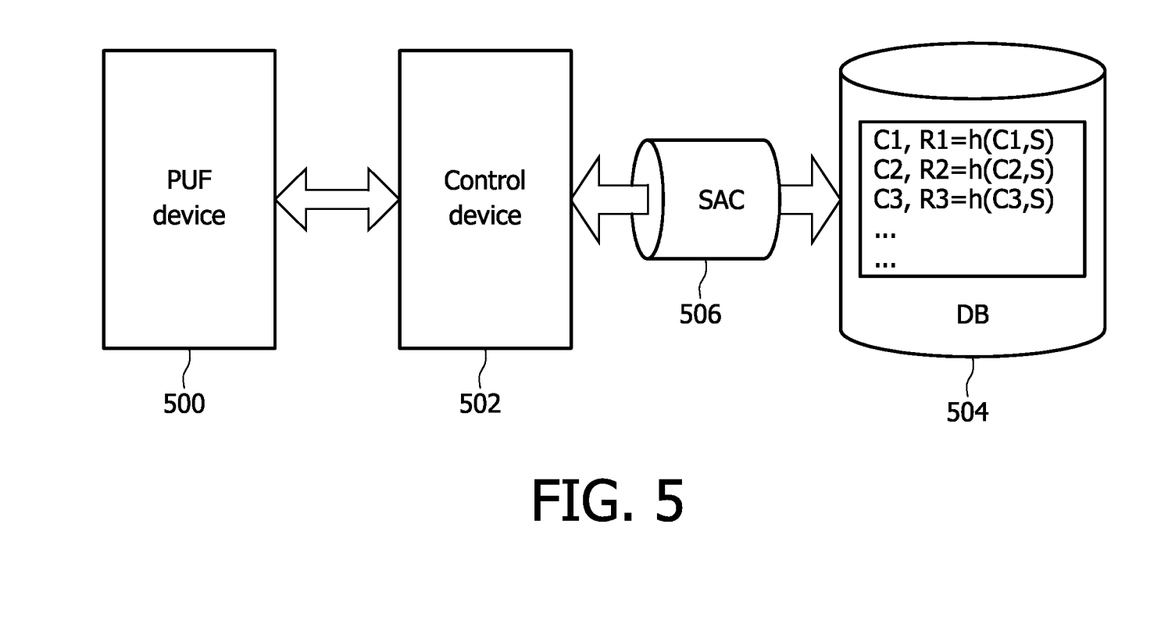
FIG. 5 diagrammatically illustrates a system for on-line verification of authenticity.

Referring to FIG. 5, an on-line verification system comprising a PUF device 500, a control device 502 and a database 504 is shown. The database may be held on a trusted external server.

The control device 502 may communicate with the database (DB) 504 via a Secure Authenticated Channel (SAC) 506.

The DB 504 may contain a number of pairs of challenges $C_i$ and responses $R_i$, wherein the response $R_i$ may be determined by using a cryptographic one-way hash function h( ) taking the challenge $C_i$ and the secret key S as input parameter, according to $R_i = h(C_i, S)$.

Figure 6:
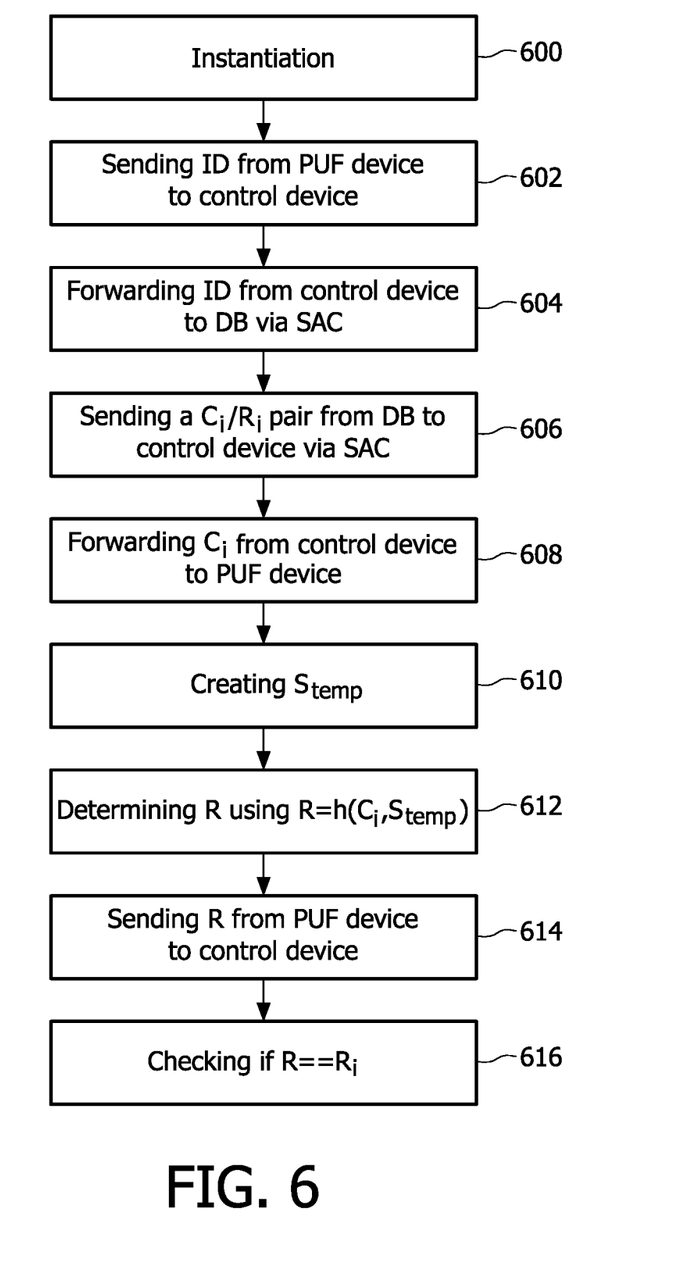
FIG. 6 shows a flow diagram for a method for on-line verification of authenticity.

Now referring to FIG. 6, the method of an on-line verification system is described.

Firstly, in step 600, an instantion message is sent from the control device to the PUF device. If the PUF device is externally powered, this step also includes powering the PUF device.

Secondly, in step 602, the PUF device sends an ID to the control device.

Thirdly, in step 604, the control device receives the ID and forwards this ID via the SAC to the DB.

Fourthly, in step 606, the database receives the ID and finds an unused $C_i/R_i$ pair and sends this back to the control device. Alternatively, a new $C_i/R_i$ pair is generated and sent back to the control device.

In order to prevent replay attacks a $C_i/R_i$ pair is preferably only used once. Therefore, after a $C_i/R_i$ pair has been used it may be deleted.

Fifthly, in step 608, the control device receives the $C_i/R_i$ pair and forwards the challenge $C_i$ to the PUF device.

Sixthly, in step 610, the PUF device receives the $C_i$. Thereafter, the PUF device creates S using the PUF pattern and stores this S in the volatile memory. If a coating PUF arrangement is used the S is created by measuring the local capacitance values of the coating.

Seventhly, in step 612, the PUF device reconstructs a response R by using the previously mentioned cryptographic one-way hash-function, $R = h(C_i, S)$.

Eighthly, in step 614, the PUF device sends the reconstructed response R to the control device.

Ninthly, in step 616, the control device receives the reconstructed response R and checks whether this reconstructed response equals the response $R_i$. If the responses are equal, the PUF pattern is considered being unchanged, which implies that the item is authentic.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A physical uncloneable function (PUF) device, comprising:
a memory that comprises a PUF pattern realized through a physical process and for determining authenticity of an item, said PUF pattern having physical characteristics that generate a secret cryptographic key which may be read by an appropriate sensor, said PUF pattern being selected from the group consisting of a coating PUF pattern containing at least two random dielectric particles with different dielectric constants may be measured and an optical PUF pattern comprising a medium containing disordered structures producing a pattern when illuminated by a laser beam, said PUF pattern being arranged to be damaged when using said item for the first time, wherein damaging the PUF pattern comprises either mechanically destroying the PUF pattern or changing the identity of the PUF pattern.

2. The PUF device according to claim 1, further comprising: a processor and communication means.

3. The PUF device according to claim 1, wherein said PUF device is formed as a label for attachment to the item.

4. A system for determining authenticity of a physical item, comprising:
a physical uncloneable function (PUF) device comprising a PUF pattern realized through a physical process and for determining authenticity of an item wherein said PUF pattern is arranged to be damaged when using said item for the first time, said PUF pattern having physical characteristics that generate a secret cryptographic key which may be read by an appropriate sensor, said PUF pattern being selected from the group consisting of a coating PUF pattern containing at least two random dielectric particles with different dielectric constants and an optical PUF pattern comprising a medium containing disordered structures producing a pattern when illuminated by a laser beam; and,
a control device arranged for communication with said PUF device.

5. The system according to claim 4, further comprising:
a database arranged for communication with said control device.

6. The system according to claim 4, wherein said PUF device and said control device are arranged in order to communicate via a zero-knowledge (ZK) protocol.

7. The system according to claim 6, wherein a commitment value is digitally signed by a trusted party using public key cryptography and stored in connection with said PUF device.

8. The system according to claim 7, wherein said digitally signed commitment and additional item information is jointly signed with a second digital signature.

9. A method for determining authenticity of an item, comprising:
adding a physical unclonable function (PUF) device comprising a PUF pattern realized through a physical process onto said item, said PUF pattern having physical characteristics that generate a secret cryptographic key which may be read by an appropriate sensor, said PUF pattern being selected from the group consisting of a coating PUF pattern containing at least two random dielectric particles with different dielectric constants and an optical PUF pattern comprising a medium containing disordered structures producing a pattern when illuminated by a laser beam, verifying the PUF pattern by interrogating the PUF device with a control device, and damaging said PUF pattern when using said item for the first time, wherein damaging the PUF pattern comprises either mechanically destroying the PUF pattern or changing the identity of the PUF pattern.

10. The method according to claim 9, further comprising signing a PUF pattern by a private key, using said PUF pattern comprises verifying said PUF pattern by a public key, and said private and public keys constitute a key pair.

* * * * *